United States Patent Office
3,438,713
Patented Apr. 15, 1969

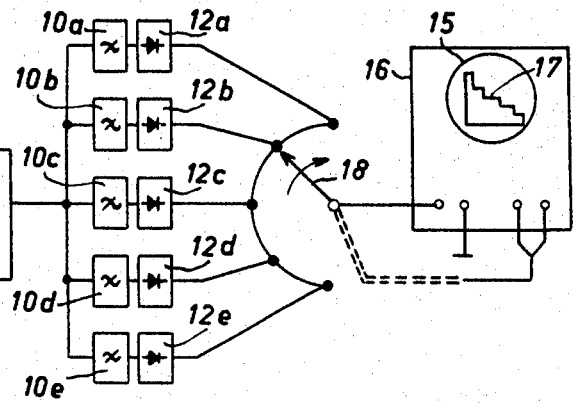

3,438,713
DEVICE FOR MEASURING OR TESTING THE IMAGE FORMING QUALITY OF LENS SYSTEMS
Erich Heynacher, Heidenheim, Wurttemberg, and Erwin Wiedmann, Essingen, Germany, assignors to Carl Zeiss, Heidenheim (Brenz), Germany
Filed Mar. 20, 1964, Ser. No. 353,408
Claims priority, application Germany, Mar. 27, 1963, Z 10,008
Int. Cl. H01j 39/12, 3/14; G01b 9/00
U.S. Cl. 356—124                               4 Claims

ABSTRACT OF THE DISCLOSURE

A device for measuring and testing the image-forming quality of optical systems according to the contrast transfer theory which assumes that the optical image is composed of sine-shaped brightness variations of different amplitude and spatial frequency. A drum rotating with a constant speed has mounted on its perimeter a number of different grating patterns onto which is projected the image of a slot by the optical system to be tested. The light transmitted by the patterns is collected by a photo-electric receiver and is converted into electrical signals which after amplification are passed through narrow band filters, each one of which is tuned to one of the spatial frequencies of said grating patterns and by means of which the modulations produced by the individual grating patterns are separated. The modulations are then rectified to indicate as D.C. voltages, which are proportional to the modulation transfer factors, the contrast values of the image formed by said optical system. For a quick quality control during the series testing of objectives the knowledge of two or even only one spatial frequency is sufficient.

---

The invention relates to a device for measuring or testing the image-forming quality of optical systems on the basis of the contrast transfer theory. This theory assumes an optical image to be composed of sine-shaped brightness variations of different amplitudes and spatial frequency (Fourier's analysis). The frequency range which is of importance for the actual image producing capacity of an objective is limited to the range which the eye of an observer of a photographic image is able to resolve. Since the transfer function under normal exposure conditions is a smooth curve in the range of interest, its definite determination requires knowledge of the transfer values for only a few spatial frequencies. For the quality control during the series testing of objectives, the knowledge of two or even only one spatial frequency is sufficient due to the substantially similar type of the transfer functions of all objectives of the series under test. The limitation to only a few or even one spatial frequency only, permits of the production of particularly economical testing devices which may be operated even by unskilled persons.

It is the object of the invention to produce a device for measuring or testing the image quality of optical systems, particularly of photographic objectives, on the basis of the contrast transfer theory by means of grid test gratings of different spatial frequencies which are arranged on a transparent drum rotating with a constant speed and which are either projected by the optical system being tested onto a scanning slit, or which conversely serve as a scanning organ for the image of a slot projected by said optical system. The device according to the invention furthermore is provided with a photoelectric receiver which transforms the optical signals into electrical signals, which latter are amplified in an electric amplifier arranged in series with said receiver. The amplifier output is fed into narrow band filters each filter of which is tuned to one of the spatial frequencies of the grating, and the modulations produced in the individual spatial pattern are separated from each other by these narrow band filters and, after being rectified, are indicated directly or indirectly as D.C. voltages proportional to the contrast values. The standardization is accomplished by means of a pattern of very low spatial frequency. The further processing of the partial signals received, i.e., standardization signal and measuring signals, differs according to the use of the device. If the device is used for the testing of prototypes, it is possible for the purpose of obtaining a quick survey, to superimpose the partial signals of the different gratings and to feed them into an oscilloscope. This device has the advantage over known devices without filter, that in spite of the use of rectangular gratings as test objects, the sine-wave modulation is measured as required by the aforementioned theory, and that a substantial improvement of the ratio of signal to noise is achieved. For recording the measuring results, the partial signals, for example, may be conducted one after the other to a dotted-line recorder so that, when the results for different image angles are recorded and the contrast transfer in a diagram as a function of the image angle with the selected spatial frequency as parameter is indicated, a clear representation of the image-forming quality of the test object across the picture area is obtained.

When employing the device according to the present invention for testing a series of objectives from a continuous production line, the modulation of one frequency or of some few frequencies can be compared with the modulation of a very low spatial frequency (standardization frequency) by way of example in the following manner: Upon rectification, from the voltage of the standardization frequency a partial voltage is tapped of a value which is equal to the value of the voltage for the limit value of the measuring voltage between permissible and nonpermissible modulation valves, so that the plus or minus sign of the difference voltage thus received indicates whether or not the contrast transfer and therewith the image quality meets the requirements.

This test is carried out on the axis and on one or a few suitably selected circular image areas.

The invention will now be described in further detail with reference to the accompanying drawings, in which:

FIG. 3 illustrates an indicating device for rendering visible the contrast transfer value on the screen of an oscilloscope;

FIG. 4 illustrates a device for recording the contrast values by means of a dotted-line recorder, and FIG. 5 illustrates a device for indicating the test result obtained during the series control of objectives in the form of a determination as to "Good" and "Bad."

Figure 1:
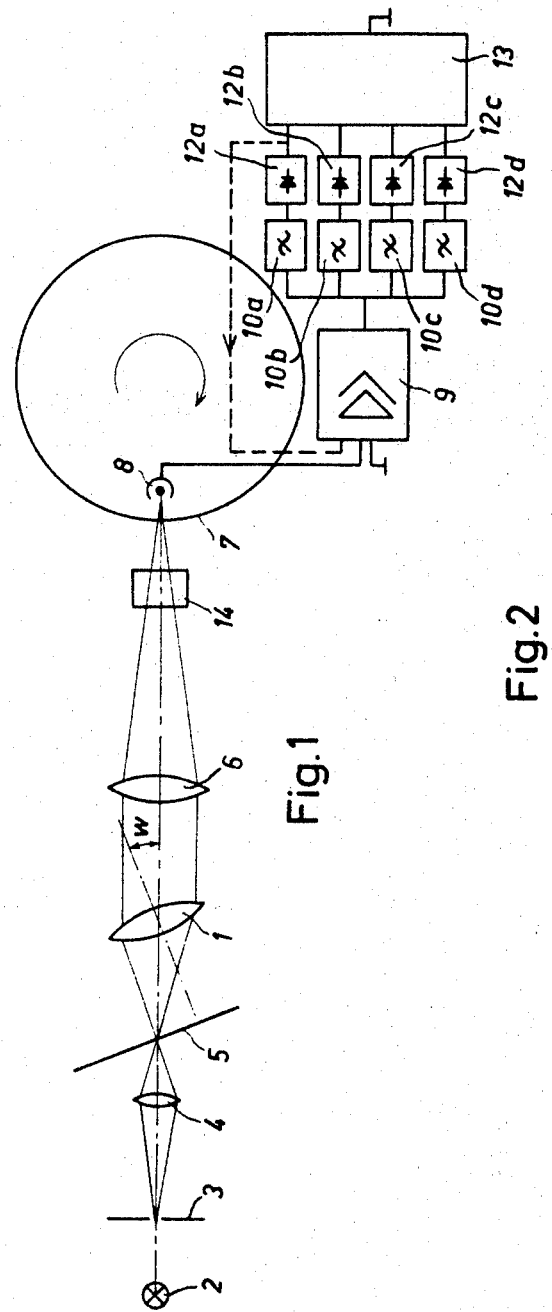
FIG. 1 illustrates the basic construction of the device of the invention.
Figure 2:
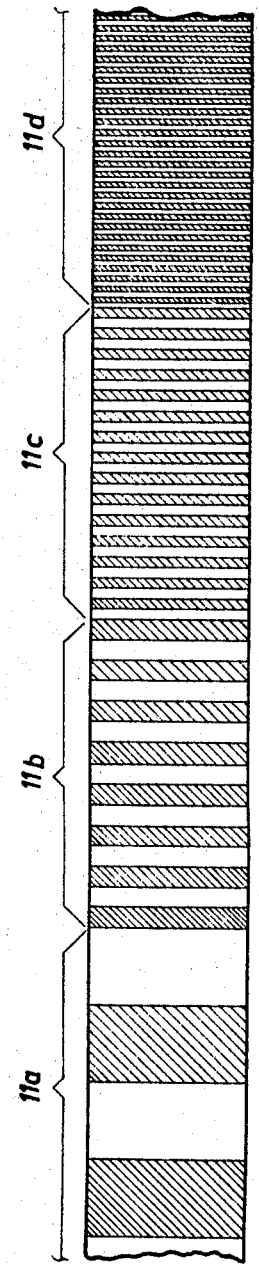
FIG. 2 shows a portion of the development of a test strip of the drum.

Referring to FIG. 1, the objective to be tested is designated by the reference character 1. A slit 3 is illuminated by a light source 2 and an image of the slit 3 is projected by a microscope objective 4 into the image plane 5 of the test objective. This slit image is projected by the test objective via a collimator 6 onto a transparent rotating test drum 7. The slit image is scanned by the test patterns on the drum. The transmitted light is collected by a photoelectric receiver 8, for instance a multiplier tube. The electric alternating voltages produced by the photo-electric receiver are of different time frequency (depending upon the different spatial frequencies of the grating patterns) and are conducted to an electric wide band amplifier 9. The amplifier output is connected to narrow band filters 10a, 10b, 10c and 10d which are tuned to the time frequencies produced during the scanning of the test patterns 11a, 11b, 11c and 11d (FIG. 2). Test 11a has such a low spatial frequency that its contrast transfer by the test objective is practically independent of the image forming quality of the same and therefore serves as a standard, while the tests 11b, 11c and 11d have higher spatial frequencies (measuring frequencies). In series with the filters 10a, 10b, 10c and 10d are arranged rectifiers 12a, 12b, 12c and 12d by which direct voltages are produced which are proportional to the corresponding modulation transfer values of the respective spatial frequencies. These D.C. voltages are conducted to an indicating device 13 which, depending upon its purpose, may be of various designs, as illustrated by the examples of FIGS. 3, 4 and 5.

The testing for tangential and radial orientation of the targets is made possible by an arrangement 14 for turning the image. For testing the image quality on a circle of predetermined diameter, the objective 1 to be tested can be rotated about its own axis.

In the embodiment of FIG. 1 the light source 2 and the photoelectric receiver 8 as well as the slit 3 and the test drum 7 with image-turning arrangement 14 may be exchanged with one another.

FIG. 2 shows by way of example the arrangement of the grid test gratings on the drum.

FIG. 3 illustrates an indicating device which is primarily suitable for the testing of objectives in the laboratory. In this embodiment of the invention, the measuring results are indicated on the fluorescent screen 15 of an oscilloscope 16. Here four spatial frequencies are separated by the filters 10b, 10c, 10d and 10e and the following rectifiers 12b, 12c, 12d and 12e. The filter for the standardization frequency is again 10a while 12a designates the pertinent rectifier. A stationary image of the modulation transfer curve 17 is obtained by means of a selector switch 18 which is rotated synchronously with the time deflection of the oscillograph 16 (motor M).

FIG. 4 illustrates a device for recording the measuring results by means of a dotted-line recorder 19. The modulation factors (K) are recorded on a tape 20 juxtaposed for different image angles (w) of the tested objective 1 (see FIG. 1). By connecting the recorded measuring points of the same spatial frequency by a line, the modulation transfer for the different spatial frequencies as parameters of a function of the image angle is obtained.

The embodiment illustrated in FIG. 5 is primarily suited for the testing of objectives produced in series. The D.C. voltages at the output of the rectifier 12a, 12b and 12c are applied to the resistances 21a, 21b and 21c. Any desired fraction of the voltage may be taken from the resistances 21a for producing the standardization signal. If the value of the tapped voltage is so selected that it is equal to the voltages of the limit values between the permissible and the modulation values no longer permissible, the plus or minus sign of the indication in intermediary zero instruments 22 shows whether or not the image quality fulfills the requirements. In an advantageous design according to the invention switching relays 22 are arranged which depending on the prefix of the voltage difference, light up a green or a red lamp indicating "Good" or "Bad" respectively.

What we claim is:

1. A device for determining the image-forming quality of an optical system, particularly of a photographic objective, by employing grating patterns of different grating frequency constants, said device comprising in combination:

(a) a transparent drum rotating at constant speed,
(b) partially transparent grating patterns of different spatial frequencies mounted in series on the perimeter of said drum,
(c) means for projecting an image of a slit by the optical system whose image-forming quality is to be determined onto and through said rotating drum so that said grating patterns perform a scanning of said slit image and produce optical signals,
(d) a photoelectric receiver within said drum energized by said optical signals produced by the scanning operation for converting said optical signals into electrical signals,
(e) means for amplifying said electrical signals,
(f) narrow band electric filters connected to the output of said amplifying means, each one of said filters being tuned to one of the spatial frequencies of said grating patterns and by means of which the modulations produced by the individual grating pattern frequencies are separated,
(g) means for rectifying said modulations which are indicated as individual direct current voltages which are proportional to the contrast transfer values of said optical system, and
(h) means for simultaneously displaying the relative values of said individual direct current voltages for obtaining a relative comparison of said contrast transfer values.

2. A device according to claim 1, in which one of said spatial frequencies of the gratings on said drum is selected to be of such a low value that its modulation transfer by said optical system is particularly independent of the image-forming quality and therefore is used for standardization.

3. A device according to claim 1, including a point recording instrument and means for feeding the output voltages of said rectifiers to said recording instrument, so that, when recording the modulation transfer factors side by side for different image angles and when connecting the measuring points for the same frequencies a plot of the modulation transfer as a function of the image angle with said frequencies as parameters is obtained.

4. A device according to claim 1, in which said means for simultaneously displaying includes an oscilloscope for the direct indication of the modulation transfer factors and a switch operating synchronously with the time deflection of said oscilloscope for successively scanning individual measuring points so that a stationary image is produced which indicates the contrast transfer values.

References Cited

UNITED STATES PATENTS

| | | | |
|---|---|---|---|
| 2,625,072 | 1/1953 | Clark et al. | 88—56 |
| 2,771,004 | 11/1956 | Sachtleben | 88—56 |
| 3,193,690 | 7/1965 | Murata et al. | 88—56 |
| 3,277,245 | 10/1966 | Sponga | 346—35 |

FOREIGN PATENTS

| | | |
|---|---|---|
| 931,442 | 8/1955 | Germany. |
| 1,131,913 | 6/1962 | Germany. |

OTHER REFERENCES

Sachtleben et al. Aperture Response Testing, 12–53, Journal of the SMPTE vol. 61, pp. 721–730.

RONALD L. WIBERT, *Primary Examiner.*

J. ROTHENBERG, JR., *Assistant Examiner.*

U.S. Cl. X.R.

356—169; 250—236, 237